(12) United States Patent
Shih et al.

(10) Patent No.: US 12,111,044 B2
(45) Date of Patent: Oct. 8, 2024

(54) MODULAR FLOODLIGHT SYSTEM

(71) Applicant: Google LLC, Mountain View, CA (US)

(72) Inventors: Poll Shih, New Taipei (TW); Che-Wei Liu, New Taipei (TW); Chia-Chi Liu, Taipei (TW); Wen-Pin Chou, New Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/263,864

(22) PCT Filed: Aug. 2, 2021

(86) PCT No.: PCT/US2021/044212
§ 371 (c)(1),
(2) Date: Aug. 1, 2023

(87) PCT Pub. No.: WO2022/177600
PCT Pub. Date: Aug. 25, 2022

(65) Prior Publication Data
US 2024/0200763 A1    Jun. 20, 2024

Related U.S. Application Data

(63) Continuation of application No. 17/178,804, filed on Feb. 18, 2021, now Pat. No. 11,346,539.

(51) Int. Cl.
*F21V 23/04*      (2006.01)
*F21S 8/00*       (2006.01)
(Continued)

(52) U.S. Cl.
CPC .......... *F21V 23/0471* (2013.01); *F21S 8/033* (2013.01); *F21V 17/105* (2013.01);
(Continued)

(58) Field of Classification Search
CPC .. F21V 23/047; F21V 17/105; F21V 33/0052; G08B 13/19
See application file for complete search history.

(56) References Cited

U.S. PATENT DOCUMENTS 8,492,961 B2   7/2013   Zeng
9,839,088 B1   12/2017  Deaton
(Continued)

FOREIGN PATENT DOCUMENTS

CN   202818682   3/2013
CN   106838725   6/2017
(Continued)

OTHER PUBLICATIONS

"Aluminum LED Heatsink", Accessed online at: https://www.ecvv.com/product/2661165.html?s=p-paying-member on Oct. 22, 2020, 3 pages.
(Continued)

*Primary Examiner* — Leah Simone Macchiarolo
(74) *Attorney, Agent, or Firm* — Colby Nipper PLLC

(57) ABSTRACT

This document describes techniques directed to a modular floodlight system. The modular floodlight system includes a floodlight device having a main housing that supports multiple floodlights and a modular camera device. The main housing includes a magnetic mount that magnetically secures the camera device to a mounting surface and enables 3-axis articulation of the camera device relative to the main housing. The main housing also includes a power supply unit that supplies electrical power to the camera device and the floodlights. In aspects, the floodlights are assembled to opposing sides of the main housing. In addition, the main housing includes passive infrared sensors that expand and supplement motion-detection capabilities of the camera device. The modular aspect of the modular floodlight system enables the camera device to be easily replaced with another
(Continued)

modular device, simplifies installation for consumers, and increases an ability of the modular floodlight system to be reworked.

20 Claims, 13 Drawing Sheets

(51) Int. Cl.
    *F21V 17/10*     (2006.01)
    *F21V 33/00*     (2006.01)
    *G08B 13/19*     (2006.01)
    *F21W 131/10*     (2006.01)

(52) U.S. Cl.
    CPC .......... *F21V 33/0052* (2013.01); *G08B 13/19* (2013.01); *F21W 2131/10* (2013.01)

(56) References Cited

U.S. PATENT DOCUMENTS

| | | | |
|---|---|---|---|
| 10,211,660 | B2 | 2/2019 | Underwood et al. |
| 10,529,206 | B2 | 1/2020 | Sacre et al. |
| 10,584,863 | B1 | 3/2020 | Mittal et al. |
| 11,002,426 | B2 | 5/2021 | Liu |
| 11,346,539 | B1 | 5/2022 | Ali et al. |
| 11,608,950 | B2 | 3/2023 | Mcdowell et al. |
| 11,867,386 | B2 | 1/2024 | Ali et al. |
| 2009/0196597 | A1 | 8/2009 | Messinger et al. |
| 2009/0244897 | A1* | 10/2009 | Anglikowski ...... F21V 23/0442 362/276 |
| 2010/0034530 | A1* | 2/2010 | Son ........................ G03B 17/00 396/427 |
| 2010/0039511 | A1 | 2/2010 | Wang |
| 2012/0235579 | A1 | 9/2012 | Chemel et al. |
| 2015/0362172 | A1 | 12/2015 | Gabriel et al. |
| 2016/0127643 | A1 | 5/2016 | Huerta et al. |
| 2018/0011390 | A1 | 1/2018 | Goulden et al. |
| 2018/0013934 | A1 | 1/2018 | Germe et al. |
| 2018/0033273 | A1 | 2/2018 | Siminoff et al. |
| 2018/0187828 | A1* | 7/2018 | Law ..................... F16M 11/125 |
| 2018/0292056 | A1 | 10/2018 | Kim et al. |
| 2019/0011557 | A1 | 1/2019 | Weber et al. |
| 2019/0017667 | A1 | 1/2019 | Mitchell et al. |
| 2020/0096842 | A1 | 3/2020 | Ramones et al. |
| 2020/0201144 | A1* | 6/2020 | Ramones ............... H04N 23/51 |
| 2022/0268434 | A1 | 8/2022 | Ali et al. |
| 2024/0085011 | A1 | 3/2024 | Ali et al. |

FOREIGN PATENT DOCUMENTS

| | | |
|---|---|---|
| CN | 108828876 | 11/2018 |
| DE | 202020106405 | 11/2020 |
| JP | 2013109440 A | 6/2013 |
| JP | 6321101 | 3/2017 |
| JP | 2017058631 A | 3/2017 |
| JP | 2017078798 A | 4/2017 |
| JP | 2019530130 A | 10/2019 |
| TW | 201422975 | 6/2014 |
| TW | M555538 | 2/2018 |
| WO | 2022177600 | 8/2022 |
| WO | 2022177601 | 8/2022 |

OTHER PUBLICATIONS

"China LED Heat Sink Aluminium", Accessed online at: https://www.pinterest.com/pin/468022586255226549/?lp=true&nic_v2=1a2S4dfl7 on Oct. 22, 2020, 1 page.
"Foreign Office Action", TW Application No. 111149622, May 23, 2023, 7 pages.
"Foreign Office Action", TW Application No. 110141073, Jun. 10, 2022, 6 pages.
"Foreign Office Action", TW Application No. 110141074, Jul. 6, 2022, 9 pages.
"Foreign Office Action", EP Application No. 21762206.7, Dec. 22, 2022, 4 pages.
"International Search Report and Written Opinion", Application No. PCT/US2021/044221, Nov. 18, 2021, 11 pages.
"International Search Report and Written Opinion", Application No. PCT/US2021/044212, Nov. 2, 2021, 13 pages.
"Non-Final Office Action", U.S. Appl. No. 17/662,827, Apr. 27, 2023, 8 pages.
"Non-Final Office Action", U.S. Appl. No. 17/178,804, Sep. 29, 2021, 10 pages.
"Notice of Allowance", U.S. Appl. No. 17/178,804, Jan. 31, 2022, 8 pages.
Sung, Peggy, "Styron to Participate at LED China in Guangzhou, Showcasing Quality Polycarbonate Resins for Lighting Applications", Accessed online at: https://investor.trinseo.com/investor-relations/news/news-details/2013/Styron-to-Participate-at-LED-China-in-Guangzhou-Showcasing-Quality-Polycarbonate-Resins-for-Lighting-Applications/default.aspx on Oct. 22, 2020, Feb. 22, 2013, 2 pages.
"Foreign Office Action", KR Application No. 10-2023-7030190, Oct. 17, 2023, 12 pages.
"International Preliminary Report on Patentability", Application No. PCT/US2021/044221, Aug. 22, 2023, 8 pages.
"Notice of Allowance", U.S. Appl. No. 17/662,827, Aug. 17, 2023, 8 pages.
"Preliminary Report on Patentability", Application No. PCT/US2021/044212, Aug. 22, 2023, 8 pages.
"Foreign Office Action", JP Application No. 2023-548925, Feb. 6, 2024, 6 pages.

* cited by examiner

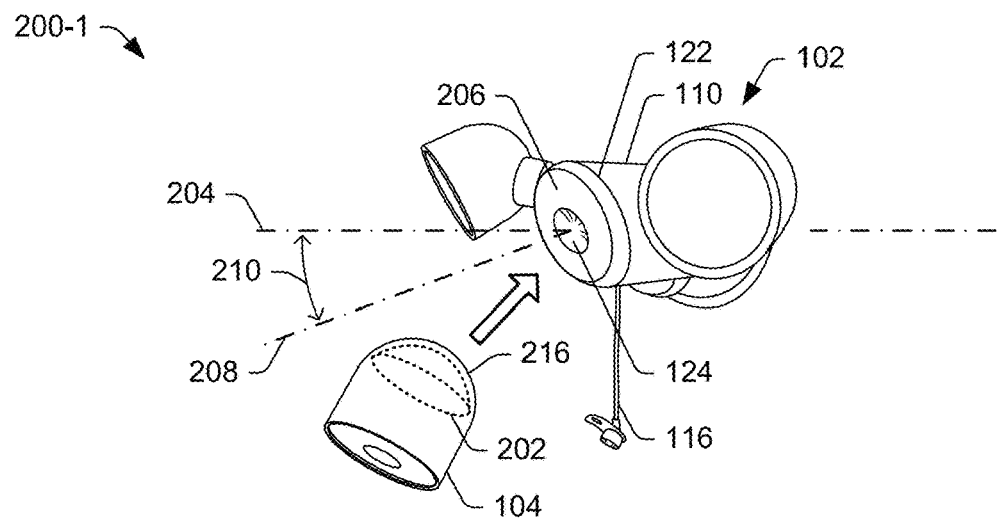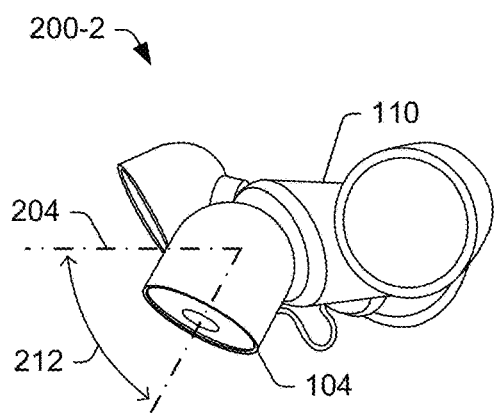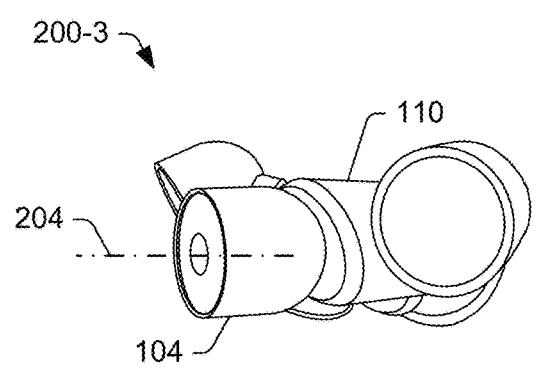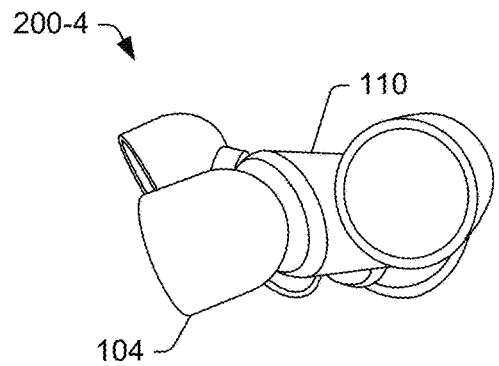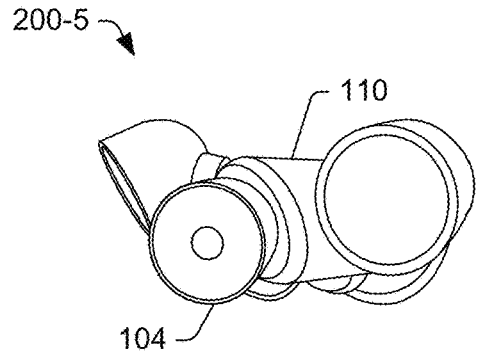
Fig. 2

MODULAR FLOODLIGHT SYSTEM

RELATED APPLICATION(S)

This application is a national stage entry of International Application No. PCT/US2021/044221, filed Aug. 2, 2021, which in turn claims priority to U.S. Non-Provisional application Ser. No. 17/178,804, filed Feb. 18, 2021, the disclosures of which are incorporated herein by reference in their entireties.

BACKGROUND

Floodlights are becoming a popular addition to home security systems. Many security systems include a security camera combined with one or more floodlights. Such security systems may implement sensors in the security camera for motion detection, which may be used to trigger video recording and/or activate the floodlights. Some of these security cameras have limited field of view (FOV) for their motion detection sensor, which, if the security system is mounted on a wall and not in a corner, may result in blind areas to the sides of the security camera where the security camera cannot detect motion usable to trigger video recording and/or activation of the floodlights. Further, depending on the manner in which the security camera is attached to the floodlights, the security camera may have limited articulation, which may reduce the customizability of camera orientation and diminish the user experience.

SUMMARY

This document describes techniques directed to a modular floodlight system. The modular floodlight system includes a floodlight device having a main housing that supports multiple floodlights and a modular camera system (e.g., a camera device). The main housing includes a magnetic mount that magnetically secures the camera device to a mounting surface and enables 3-axis articulation of the camera device relative to the main housing. The main housing also includes a power supply unit (PSU) that supplies electrical power to the camera device and the floodlights. In aspects, the floodlights are assembled to opposing sides of the main housing. In addition, the main housing includes passive infrared (PIR) sensors that expand and supplement motion-detection capabilities of the camera device. The modular aspect of the modular floodlight system enables the camera device to be easily replaced with another modular device, simplifies installation for consumers, and increases an ability of the modular floodlight system to be reworked.

In some aspects, a modular floodlight system is described. The modular floodlight system includes a floodlight device having a main housing, first and second light subassemblies, a PIR lens, and a magnet mount assembly. The main housing has a generally cylindrical shell with a central axis intersecting opposing first and second ends of the main housing. The first and second light subassemblies are connected to the main housing at lateral sides of the shell that are substantially parallel to the central axis. In aspects, the main housing is positioned between the first and second light subassemblies and each of the first and second light subassemblies include a light housing having a general cylindrical shell with a rounded cap. The PIR lens is positioned on a side of the main housing and between the first and second light subassemblies. Further, the PIR lens has a dome shape that protrudes from the side of the main housing and houses multiple PIR sensors configured to detect motion of an object within a field of view of the multiple PIR sensors. The magnet mount assembly is attached to the first end of the main housing. Also, the magnet mount assembly includes a front surface defining a plane that is non-orthogonal to the central axis of the main housing. The magnet mount also includes a magnet providing a magnetic force configured to act on a metal part of a modular camera device to magnetically secure the modular camera device to the magnet mount.

In some implementations, the floodlight device further comprises a mounting component having a flexible material that forms a contact surface for mounting a camera device, the mounting component is positioned between the magnet and the front surface, and the contact surface is a concave surface that is complementary to an exterior convex surface of the camera device.

In some implementations, the plane defined by the front surface is tilted relative to the central axis by a tilt angle that is a non-zero angle up to approximately 45 degrees.

In some implementations, the modular floodlight system further comprises the camera device, wherein the camera device includes a housing having a general cup shape with a rounded closed end, the rounded closed end has a convex exterior surface; and the camera device, when assembled to the magnet mount assembly, includes 3-axis articulation relative to the main housing. In some of these implementations, the camera device includes the metal part inside of the housing. In addition or as an alternative, in some of these implementations, the 3-axis articulation of the camera device is pivoted at a center of curvature of the convex exterior surface of the camera device. In addition or as an alternative, in some of these implementations, the 3-axis articulation of the camera device includes slidable movement of the exterior convex surface of the housing of the camera device on the magnet mount assembly.

In some implementations, the modular floodlight system further comprises a power supply unit positioned within the main housing, wherein the power supply unit is configured to provide electrical power to the first and second light subassemblies and the multiple PIR sensors. In some of these implementations, the modular floodlight system further comprises a cable configured to connect the power supply unit to the camera device to enable the power supply unit to provide electrical power to the camera device. In some of these implementations, the cable has a length sufficient to enable the camera device to have a range of tilt substantially between zero degrees and 60 degrees relative to the central axis of the main housing, the camera device is aligned with the central axis when the tilt angle is zero degrees, and the camera device is facing a direction between the central axis and the multiple PIR sensors when the tilt angle is 60 degrees.

In some implementations, the magnet mount assembly enables the camera device to have 3-axis articulation. In some of these implementations, the 3-axis articulation includes a range of pan of substantially 35 degrees to −35 degrees relative to the central axis of the main housing.

In some implementations, the modular floodlight system further comprises a wallplate configured to mount to a surface, wherein the first end of the main housing is assembled to the wallplate via a twist lock mechanism formed via protrusions mating with apertures or channels based on a twist motion of the main housing about the central axis and relative to the wallplate.

In some implementations, a respective light subassembly of the first and second light subassemblies is connected to the main housing via a hinge that enables the respective light subassembly to pivotally rotate about three axes.

In some implementations, the modular floodlight system further comprises a microcontroller unit, wherein the microcontroller unit is configured to, responsive to motion detected by the multiple PIR sensors: activate the first and second light subassemblies to provide light, and signal the camera device to activate an image sensor of the camera device and begin capturing images or recording video.

In aspects, a floodlight device is disclosed. The floodlight device includes a main housing, a plurality of light subassemblies, a power supply unit, a magnet mount assembly, and a plurality of PIR sensors. The main housing forms a shell that is generally cylindrical about a central axis. The shell has a first end for mounting a camera device. In addition, the shell has a second end that is opposite the first end and is for assembling the main housing to a wallplate configured to be mounted to a surface. The plurality of light subassemblies are attached to the main housing and are configured to provide a wide illumination range to an environment of the floodlight device. The power supply unit is positioned within the main housing and configured to provide electrical power to the plurality of light subassemblies and a mounted camera device. The magnet mount assembly is attached to the first end of the main housing. Also, the magnet mount assembly includes a contact surface and a magnet providing a magnetic force configured to act on a metal part in the mounted camera device to magnetically secure the mounted camera device to the contact surface. The plurality of PIR sensors are positioned proximate to a lateral side of the main housing and between the first and second ends. The plurality of PIR sensors have a PIR FOV usable to supplement a camera PIR FOV of a camera system associated with the floodlight device.

The details of one or more implementations are set forth in the accompanying drawings and the following description. Other features and advantages will be apparent from the description, the drawings, and the claims. This summary is provided to introduce subject matter that is further described in the Detailed Description. Accordingly, a reader should not consider the summary to describe essential features nor limit the scope of the claimed subject matter.

BRIEF DESCRIPTION OF THE DRAWINGS

The details of one or more aspects of a modular floodlight system are described below. The use of the same reference numbers in different instances in the description and the figures indicate similar elements:

FIG. 2 illustrates examples of the modular floodlight system from FIG. 1 supporting the camera device in different orientations;

DETAILED DESCRIPTION

Overview

This document describes techniques directed to a modular floodlight system. The modular floodlight system includes a floodlight device (also referred to as an accessory unit) and a modular camera system (e.g., modular camera device, camera unit). The floodlight device includes floodlights and motion detection sensors used to activate the floodlights and the modular camera system. In addition, the floodlight device includes a magnetic mount that magnetically secures the modular camera system to the floodlight device. The modular camera system includes a camera device with a rounded exterior surface that magnetically mounts to a concave mounting surface of the floodlight device, which enables 3-axis articulation of the camera device relative to the floodlight device. The floodlight device also provides electrical power to the camera device, the floodlights, and a PIR system on the floodlight device that expands and supplements a PIR capability of the modular camera system.

The modular floodlight system described herein provides a modular design that enables user-friendly installation and setup by consumers, easily adjustable positioning of the camera device relative to the floodlight device, expanded PIR capabilities for the camera device, and interchangeability of the camera device. The modular floodlight system also includes a compact structure that reduces its volume but includes a power supply unit capable of powering the floodlights, the PIR sensors, and the camera device. Further, the magnetic mounting provides increased articulation of the camera device relative to the floodlight device in comparison to many conventional floodlight systems.

Example Operating Environment and System

Figure 1:
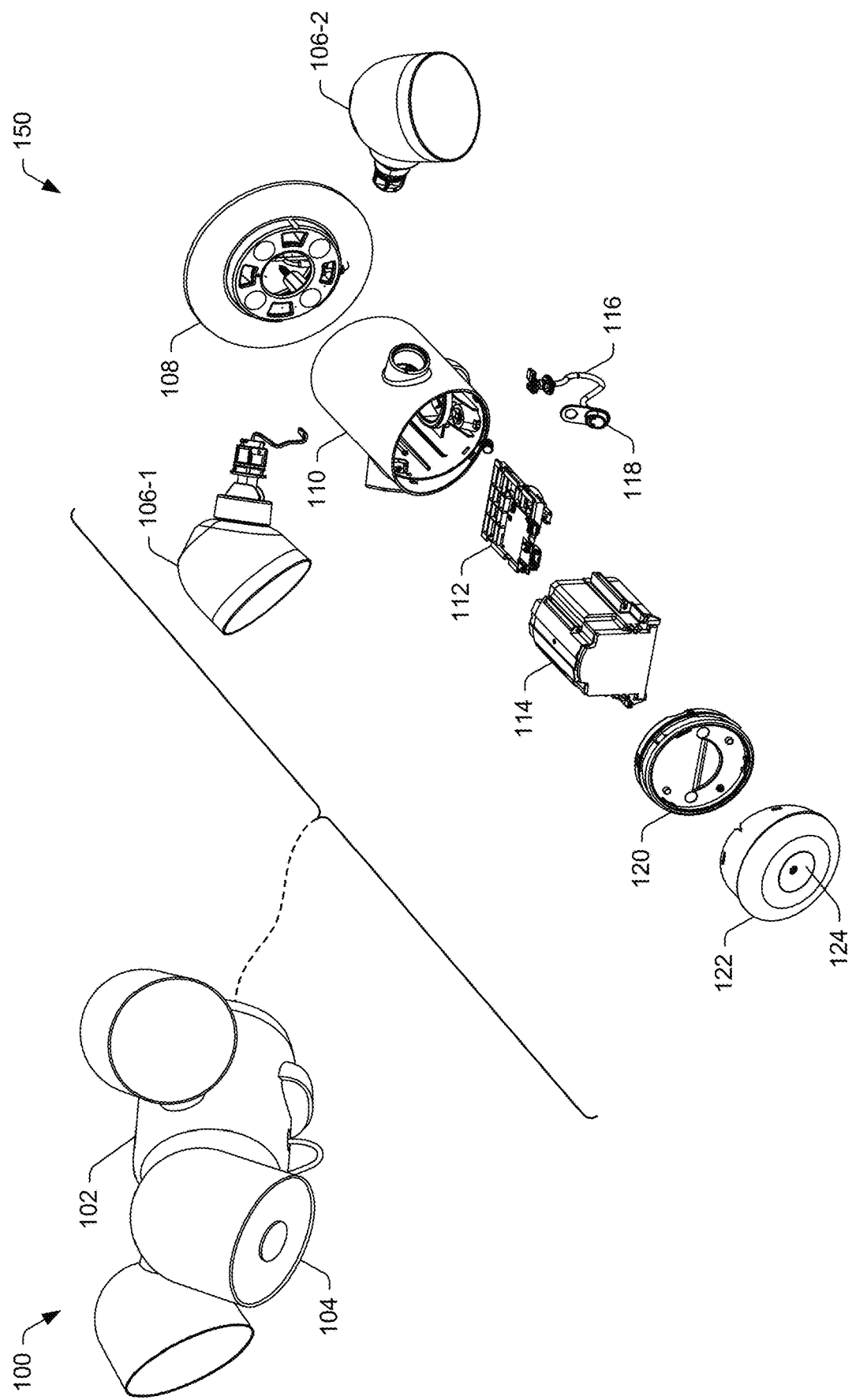
FIG. 1 illustrates an example implementation of a modular floodlight system and an exploded view of some components thereof.

FIG. 1 illustrates an example implementation of a modular floodlight system 100 and an exploded view 150 of some components thereof. The modular floodlight system 100 may include a floodlight device 102 configured to communicate with, and be connected to, a modular camera system (e.g., camera device 104) that is removably assembled to the floodlight device 102. In aspects, the camera device 104 is integrated into the modular floodlight system 100 via a magnetic force that magnetically and removably secures the camera device 104 to the floodlight device 102 (e.g., a magnet inside the floodlight device 102 acts on a metal part (not shown) inside the camera device 104). The camera device 104 includes a housing having a general cup shape with a rounded closed end and an image sensor at an opposing end. The floodlight device 102 may also include one or more light subassemblies 106 configured to provide a wide illumination range to an environment of the modular floodlight system 100. In an example, the floodlight device 102 may include a first light subassembly 106-1 and a second light subassembly 106-2. A wallplate 108 is configured to be affixed to a wall, in particular to a junction box having electrical wiring connected to a power source. The wallplate 108 may be configured to adapt to different configurations of junction boxes.

The floodlight device 102 includes a main housing 110 that connects to the wallplate 108. In one example, the main housing 110 is secured to the wallplate via a twist lock mechanism (e.g., formed via protrusions mating with apertures or channels and locking into place via a twist motion of the main housing 110, relative to the wallplate 108). The main housing 110 is a generally cylindrical shell that may be formed from plastic via one or more injection molding techniques. The main housing 110 includes a first end (e.g., front end for mounting a modular camera system) and a second end (e.g., back end for assembling to the wallplate 108). The shell may be generally cylindrical about a longitudinal axis that intersects the first and second ends. In some aspects, the shell may have any suitable shape for a cross-section, including a triangular shape, a rectangular shape, a trapezoidal shape, elliptical shape, and so forth. The first and second light subassemblies 106-1 and 106-2, respectively, are attached to opposing sides (e.g., lateral sides) of the main housing 110. In the illustrated examples, the lateral sides of the main housing 110 are sides of the main housing 110 that do not intersect the longitudinal axis of the cylindrical shape of the main housing 110.

The floodlight device 102 may include a PIR module 112 and a PSU 114. The PIR module 112 is configured to detect motion within a range of the floodlight device 102. The PSU 114 is configured to provide power to one or more components, including the PIR module 112, the light subassemblies 106, and the camera device 104. In an example, the PSU 114 provides electrical power to the camera device 104 via a cable 116 (e.g., a pogo cable) with a connector 118 (e.g., connector having pogo pins) that connects to the camera device 104.

Also, the floodlight device 102 includes an inner frame subassembly 120 and a magnet mount assembly 122. The magnet mount assembly 122 is configured to receive and support the camera device 104 via a magnetic force of a magnet inside the magnet mount assembly 122 acting on a metal part (or multiple metal parts) inside the camera device 104. The inner frame subassembly 120 is configured to shield the PSU 114 from a magnetic field associated with the magnetic force generated by the magnet. As described in further detail herein, the magnet mount assembly 122 includes a concave surface 124 for receiving a complementary convex exterior surface of the rounded closed end of the camera device 104. Because the exterior surface of the camera device 104 is rounded and magnetically affixed to the concave surface 124 of the magnet mount assembly 122 by the magnetic force, the camera device 104 can be reoriented (e.g., rotated, tilted, panned) in three axes relative to the main housing 110 to redirect its field of view. Further details are described in relation to FIG. 2.

FIG. 2 illustrates examples (e.g., examples 200-1, 200-2, 200-3, 200-4, and 200-5) of the modular floodlight system 100 from FIG. 1 supporting the camera device 104 in different orientations. In example 200-1, the camera device 104 is being magnetically mounted to the floodlight device 102 based on a magnet inside the main housing 110 acting on a metal part (e.g., metal part 202) located within a housing of the camera device 104. The main housing 110 of the floodlight device 102 includes a longitudinal axis (e.g., a central axis 204). In the illustrated example, the central axis 204 is substantially horizontal based on an assumption that the floodlight device 102 is mounted to a wall (not shown). Accordingly, the central axis 204 may be substantially orthogonal to a surface on which the floodlight device 102 (or the wallplate 108) is mounted.

The magnet mount assembly 122 includes a front surface 206 defining a plane that is non-orthogonal to the central axis 204 of the main housing 110. Rather, the front surface 206 is tilted to face a direction (e.g., axis 208 is normal to the front surface 206) that is approximately 20 degrees below the central axis 204, or below a plane (e.g., a horizontal plane) that is parallel with the central axis 204. For example, the axis 208 and the central axis 204 form a tilt angle 210 of approximately 20 degrees. However, any suitable tilt angle 210 can be implemented, including a non-zero angle up to approximately 45 degrees.

The tilt angle 210 of the front surface 206 relative to the central axis 204 of the main housing 110 is used in combination with the camera device 104 to provide a range of tilt of the camera device 104 of approximately zero to 60 degrees below the central axis 204 for an FOV of approximately 130 degrees diagonal (e.g., 110 degrees horizontal and 56 degrees vertical). The determination of the tilt angle 210 is based on several factors, including an FOV of an image sensor of the camera device 104, an average height expected for the camera device 104 to be mounted above ground by users, the length of the cable 116, and so forth. For example, based on an assumption that the main housing 110 is to be mounted to a vertical wall, the camera device 104 may have a range of tilt between zero and 60 degrees below a horizontal plane. Further, the length of the cable 116 is sufficient for the camera device 104 to rotate upward (toward the central axis 204) to have a zero-degree tilt angle and +30-degree pan angle relative to the central axis 204. In addition, the tilt angle 210 enables increased articulation of the camera device 104 for the user to direct or position the camera device 104 in a particular orientation. For instance, the camera device 104 may be oriented to enable the FOV of the image sensor of the camera device 104 to include an area that is directly below the main housing 110 and proximate to the wall to which the main housing 110 is mounted.

Examples 200-2 and 200-3 illustrate the range of tilt of the camera device 104 relative to the main housing 110 of the floodlight device 102. In example 200-2, the camera device 104 is facing downward. The camera device 104 may tilt downward to an angle (e.g., angle 212) of approximately 60 degrees relative to the central axis 204 of the main housing 110. In example 200-3, the camera device 104 is facing a substantially horizontal direction or a direction substantially parallel to the central axis 204 of the main housing 110.

Examples 200-3 and 200-4 illustrate the range of pan of the camera device 104 relative to the main housing 110 of the floodlight device 102. In example 200-4, the camera device 104 is turned toward the left of the illustration. In example 200-5, the camera device 104 is turned toward the right of the illustration. When reorienting the camera device 104, the exterior convex surface of the camera device 104 may slide on the concave surface 124 of the magnet mount assembly 122, enabling the magnet on the inside of the magnet mount assembly 122 to act on a different portion of the metal part 202, or on a different metal part, inside the camera device 104. In this way, the camera device 104 may pivotally move relative to a pivot point, which may be a location within the camera device (e.g., at a center of curvature of the exterior convex surface of the camera device). In particular, the 3-axis articulation of the camera device 104 is pivoted at the center of curvature of the convex exterior surface of the camera device 104.

The range of pan of the camera device 104 relative to the main housing 110 may be defined by one or more characteristics (e.g., a radius of curvature, diameter, depth) of the concave surface 124 of the magnet mount assembly 122 in combination with the geometry of a mounting surface 216 of the camera device 104 itself, including a radius of curvature of the mounting surface 216, a diameter of the mounting surface 216, a size (e.g., area) of the mounting surface 216, and so on. In an example, the camera device 104 may have a range of pan of approximately 60 degrees to approximately −60 degrees relative to the central axis 204.

The range of tilt may also be defined by the one or more characteristics of the concave surface 124 of the magnet mount assembly 122 in combination with the geometry of the mounting surface 216 of the camera device. In some instances, the range of tilt may be further defined by a length of the cable 116, which electrically connects the camera device 104 to the PSU 114.

Figure 3:
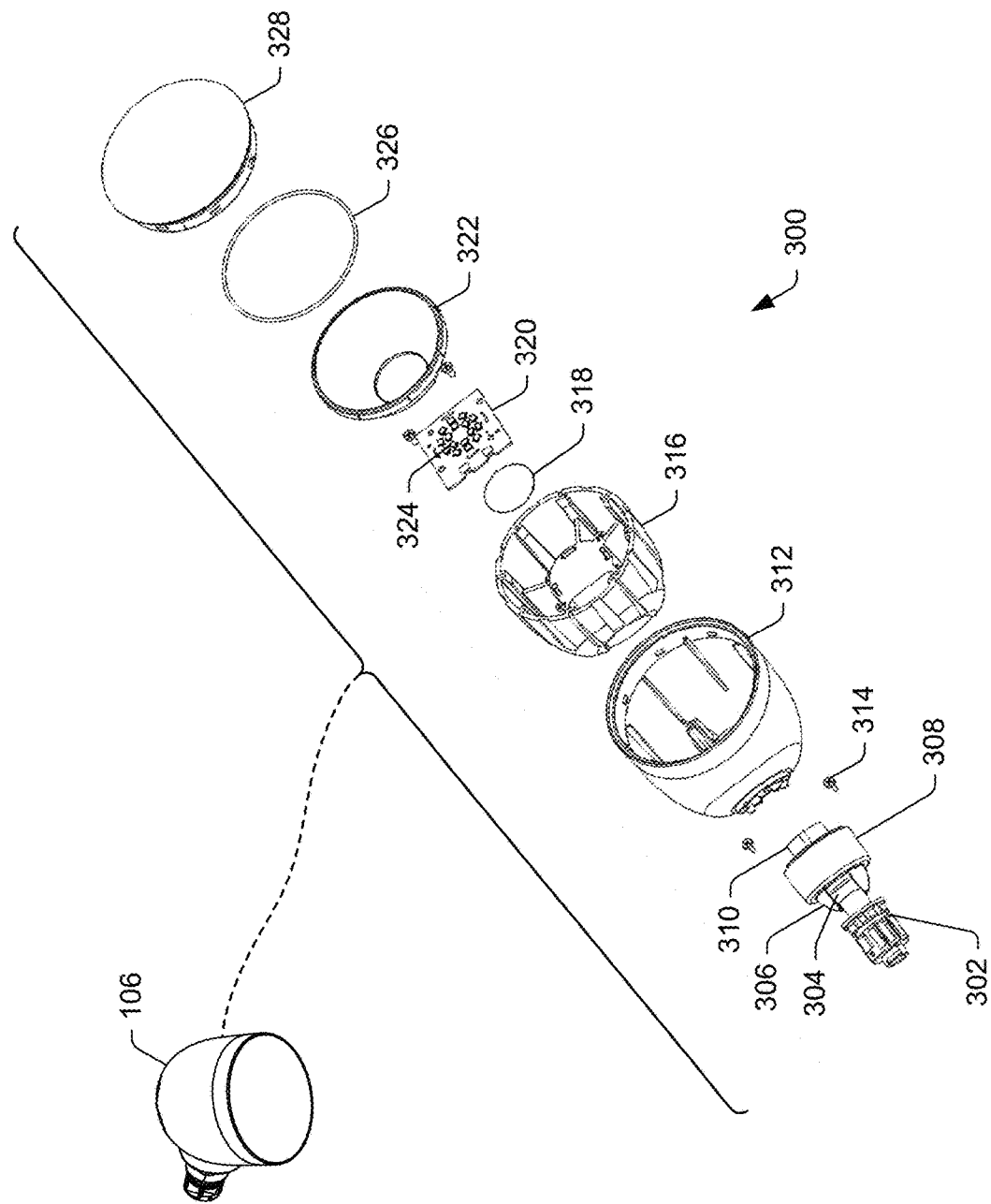
FIG. 3 illustrates an exploded view of the light subassembly from FIG. 1.

FIG. 3 illustrates an exploded view 300 of the light subassembly 106 from FIG. 1. The light subassembly includes a hinge 302 with a rounded end 304 that is usable in combination with a ball cap 306 and a ball cover 308 to form a hinge (e.g., ball joint), which is pivotally movable in up to three different axes. The ball cover 308 connects to a holder 310, which connects to a light housing 312. In aspects, the ball cover 308 fastens (e.g., threads onto) to the holder 310. As the ball cover 308 is tightened on the holder 310, the ball cover 308 provides a compression force onto the ball cap 306, which in turn provides a clamping force on the rounded end 304 of the hinge 302. Accordingly, the user can loosen the ball cover 308 to pivotally reposition the light subassembly 106 about the hinge 302 and relative to the main housing 110 in FIG. 2. The holder 310 may be attached to the light housing 312 via one or more fasteners 314 (e.g., screws). To prevent water ingress, a rubber seal may be positioned between the holder 310 and the light housing 312. In addition, the hinge 302 (and the rounded end 304) is hollow. For example, the hinge 302 may define an aperture that is coaxial with a longitudinal axis of the hinge 302 to enable electrical wires to pass through the aperture. In some implementations, a seal may be positioned around the electrical wires and within the aperture of the hinge 302 to prevent water ingress. The seal may be glued inside the aperture of the hinge 302 to secure the seal in place.

The light housing 312 has a general cup shape with an open end and a rounded, closed end. In the illustrated example, the light housing 312 is a generally cylindrical shell with a rounded cap. The light housing 312 may be plastic and formed from injection molding techniques. In addition, the light subassembly 106 includes a heatsink 316 that fits inside the light housing 312. The heatsink 316 has a shape that is generally complementary to an interior surface of the light housing 312 (e.g., generally cylindrical with a rounded end). The heatsink 316 also defines a cavity to house various components including a thermal interface material 318, a light-emitting diode (LED) board 320, and a reflector 322. The LED board 320 includes an array of LEDs 324 to provide light. The reflector 322 is used to reflect the light provided by the array of LEDs 324. A seal 326 (e.g., O-ring) may be included to prevent water ingress between a lens 328 and the light housing 312. The lens 328 may be any suitable lens for a floodlight.

Figure 4:
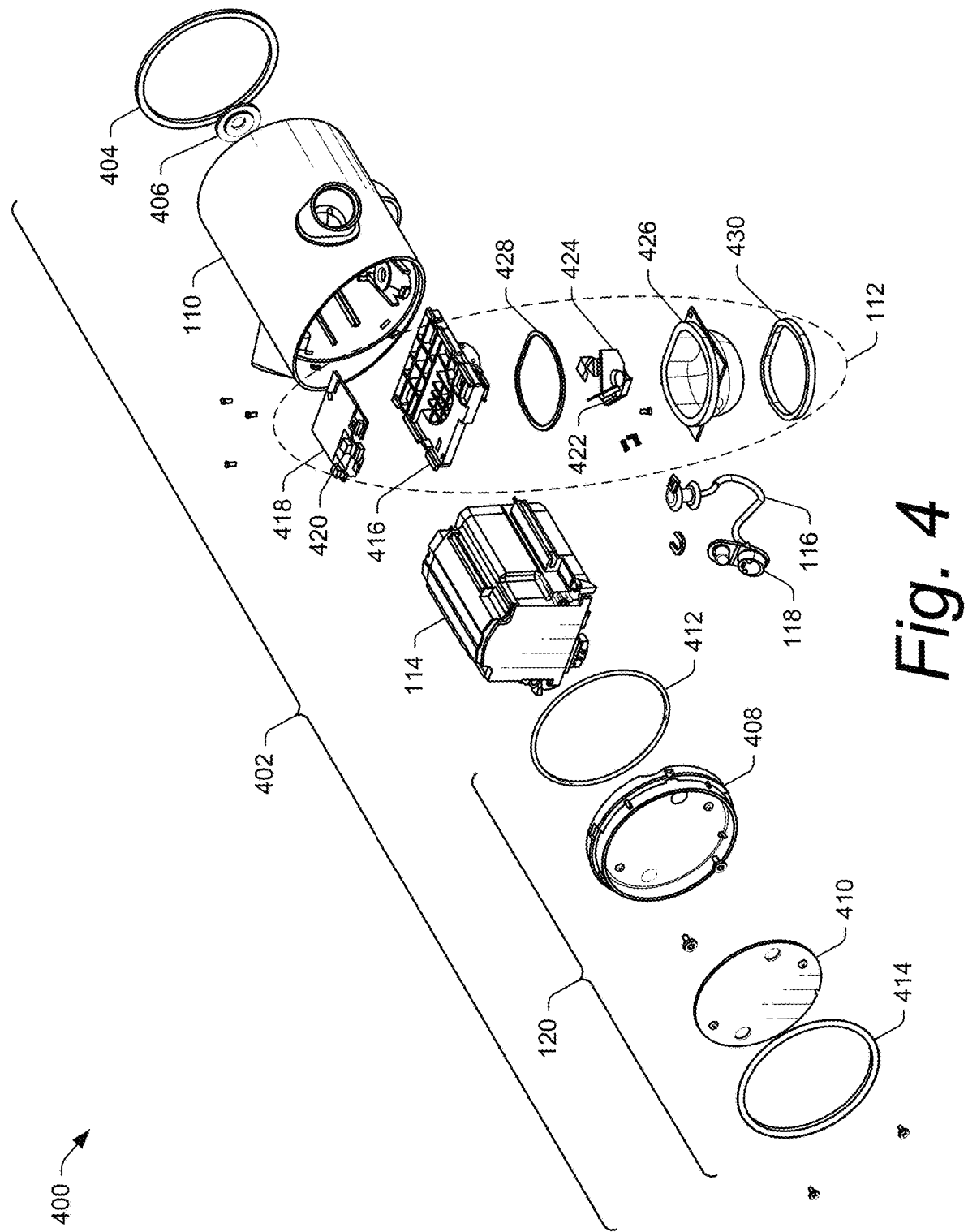
FIG. 4 illustrates an exploded view of a main housing assembly of the floodlight device from FIG. 1.

FIG. 4 illustrates an exploded view 400 of a main housing assembly 402 of the floodlight device 102 from FIG. 1. The main housing assembly 402 includes the inner frame subassembly 120, the PSU 114, the PIR module 112, the cable 116, and the main housing 110. In some aspects, the main housing assembly 402 also includes a rubber seal 404 and a gasket 406. The rubber seal 404 provides a water seal between the main housing 110 and the wallplate 108 (in FIG. 1) The gasket 406 covers a portion of an aperture in the main housing 110 through which electric wires (not shown) are routed into the main housing 110 from a power source.

The inner frame subassembly 120 includes an inner frame 408 with a magnet shielding component 410. The inner frame 408 may be a generally cylindrical shell with an open end and an opposing closed end, defining a recessed area within the shell. The magnet shielding component 410 may have a disk-like shape and be supported within the recessed area of the inner frame 408. The magnet shielding component 410 is positioned between the PSU 114 and the magnet mount assembly 122 (shown in FIG. 1) to help protect the PSU 114 from a magnetic field generated by a magnet in the magnet mount assembly 122. The inner frame subassembly 120 may also include a gasket 412 to provide a watertight seal between the inner frame 408 and the main housing 110. The inner frame subassembly 120 may also include a gasket 414 to provide a watertight seal between the inner frame 408 and the magnet mount assembly 122 from FIG. 1.

The PIR module 112 includes a PIR holder 416 having a surface for mounting a PIR board 418 populated with a microcontroller unit (MCU) 420. The MCU 420 may be communicatively connected to multiple PIR sensors 422 and configured to operate the PIR sensors 422. The MCU 420 may also be communicatively connected to the light subassemblies 106 and a mounted device (e.g., the camera device 104). The PIR sensors 422 are attached to a PIR flex component 424 that is assembled to the PIR holder 416. In this way, the PIR holder 416 is positioned between the MCU 420 and the PIR flex component 424. A PIR lens 426 covers the PIR sensors 422 and is affixed to the PIR holder 416 (e.g., the PIR lens 426 has a bowl shape forming a cavity that houses the PIR sensors 422 and the PIR flex component 424). A gasket 428 may be positioned between the PIR lens 426 and the PIR holder 416. Another gasket 430 may be positioned between the PIR lens 426 and the main housing 110. The main housing 110 includes an aperture on a bottom side of the main housing 110 through which the PIR lens 426 is positioned. In this way, the PIR lens 426 attaches to an interior surface of the main housing 110, and the PIR sensors 422 (positioned within the PIR lens 426) are positioned outside of the cylindrical shell of the main housing 110.

Figure 5:
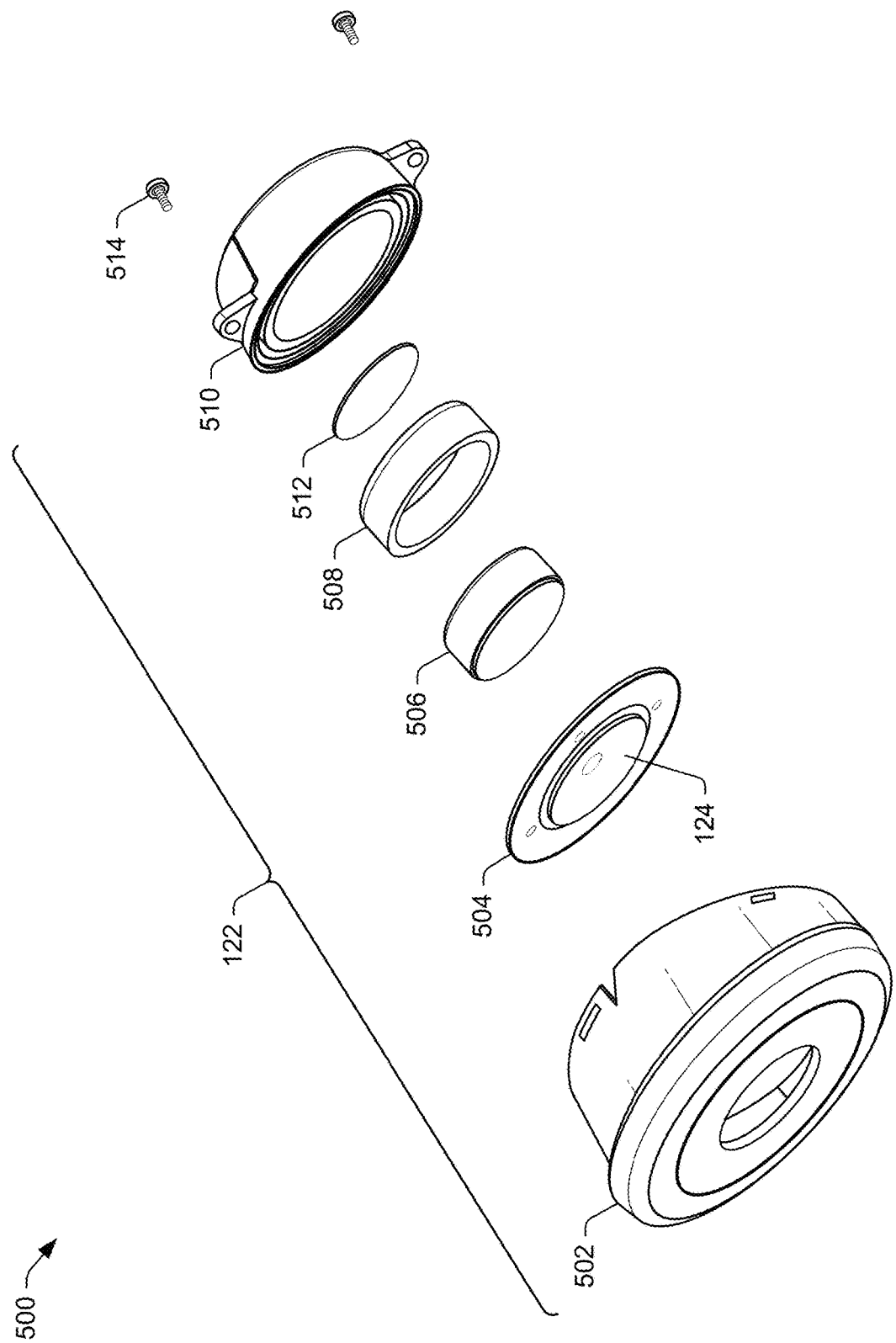
FIG. 5 illustrates an exploded view of the magnet mount assembly from FIG. 1.

FIG. 5 illustrates an exploded view 500 of the magnet mount assembly 122 from FIG. 1. The magnet mount assembly 122 includes a front cover 502, a mounting component 504, a magnet 506, a magnet shroud 508, and a magnet holder 510. In aspects, the magnet shroud 508 is affixed to the magnet holder 510 via adhesive 512 (e.g., pressure-sensitive adhesive (PSA)). The magnet holder 510 may be affixed to the front cover 502 via one or more fasteners 514 (e.g., screws). The magnet holder 510 defines a cavity that houses the mounting component 504, the magnet 506, and the magnet shroud 508.

The magnet shroud 508 supports the magnet 506 within a recessed area to cover the back and sides of the magnet 506 and block a magnetic field, generated by the magnet 506, from reaching the PSU 114 positioned on an opposing side of the magnet shroud 508 from the magnet 506 (as shown in FIG. 1). The magnet shroud 508 does not cover a front of the magnet 506.

The mounting component 504 includes a flexible material forming a contact surface for mounting the camera device 104. In aspects, the mounting component 504 provides a flexible concave surface (e.g., the concave surface 124) between the magnet 506 and a mounted device (e.g., the camera device 104). The concave surface 124 may be complementary to the convex exterior surface of the camera device 104. The mounting component 504 may have a planar surface opposite the concave surface 124, where the planar surface abuts the magnet 506.

Figure 6:
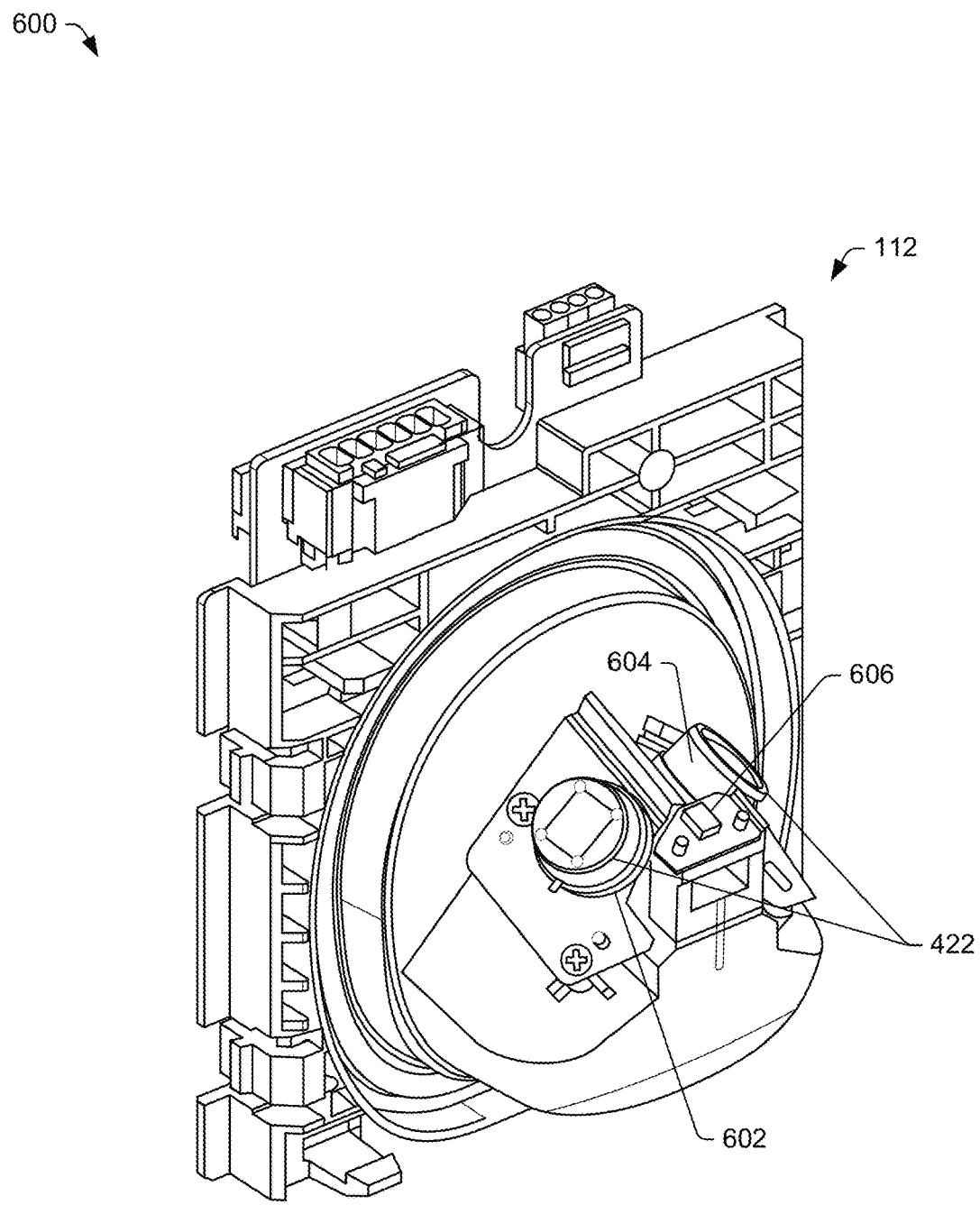
FIG. 6 illustrates an enlarged view of the PIR module from FIG. 1.

FIG. 6 illustrates an enlarged view 600 of the PIR module 112 from FIG. 1. As illustrated, the PIR sensors 422 are oriented at 60 to 90 degrees from one another, such that the PIR sensors 422 face away from each other. This 60 to 90 degree offset in orientation provides an overall FOV having a horizontal angular range of approximately 180 degrees. Accordingly, when the floodlight device 102 (in FIG. 1) is mounted to a wall, the overall FOV of the PIR sensors 422 captures an area that includes both the left and right sides of the floodlight device 102 proximate to the wall. An example of the FOV of the PIR sensors 422 is illustrated in FIG. 7.

To prevent noise, the PIR sensors 422 are grounded and include shielding. A substrate 602 (e.g., printed circuit board (PCB)) is added under each PIR sensor 422 to ground pins of the PIR sensor 422. In an example, the PIR sensors 422 each include four pins on the backside of the PIR sensor 422. The substrate 602 is mounted to a flexible printed circuit (FPC) via one or more surface mount technologies (SMT) and used as a spacer with shielding for the PIR sensor 422. Also, conductive adhesive may be positioned on the backside of the PIR sensor 422 (e.g., between the PIR sensor and the substrate 602) to ground the PIR sensor 422 and its pins. Additional shielding 604 may be added to ground sidewalls of the PIR sensor 422. The additional shielding 604 may include a generally cylindrical metal tube positioned around the sidewalls of the PIR sensor 422. Grounding and shielding the PIR sensor 422 in this manner significantly reduces the effects of noise on the performance of the PIR sensors 422.

An ambient light sensor 606 may be included on the PIR holder 416 and positioned between the PIR sensors 422. In this configuration, the ambient light sensor 606 is directed forward (e.g., aligned horizontally with the central axis 204 of the main housing 110) and tilted downward at an angle from the central axis 204 of the main housing 110.

Figure 7:
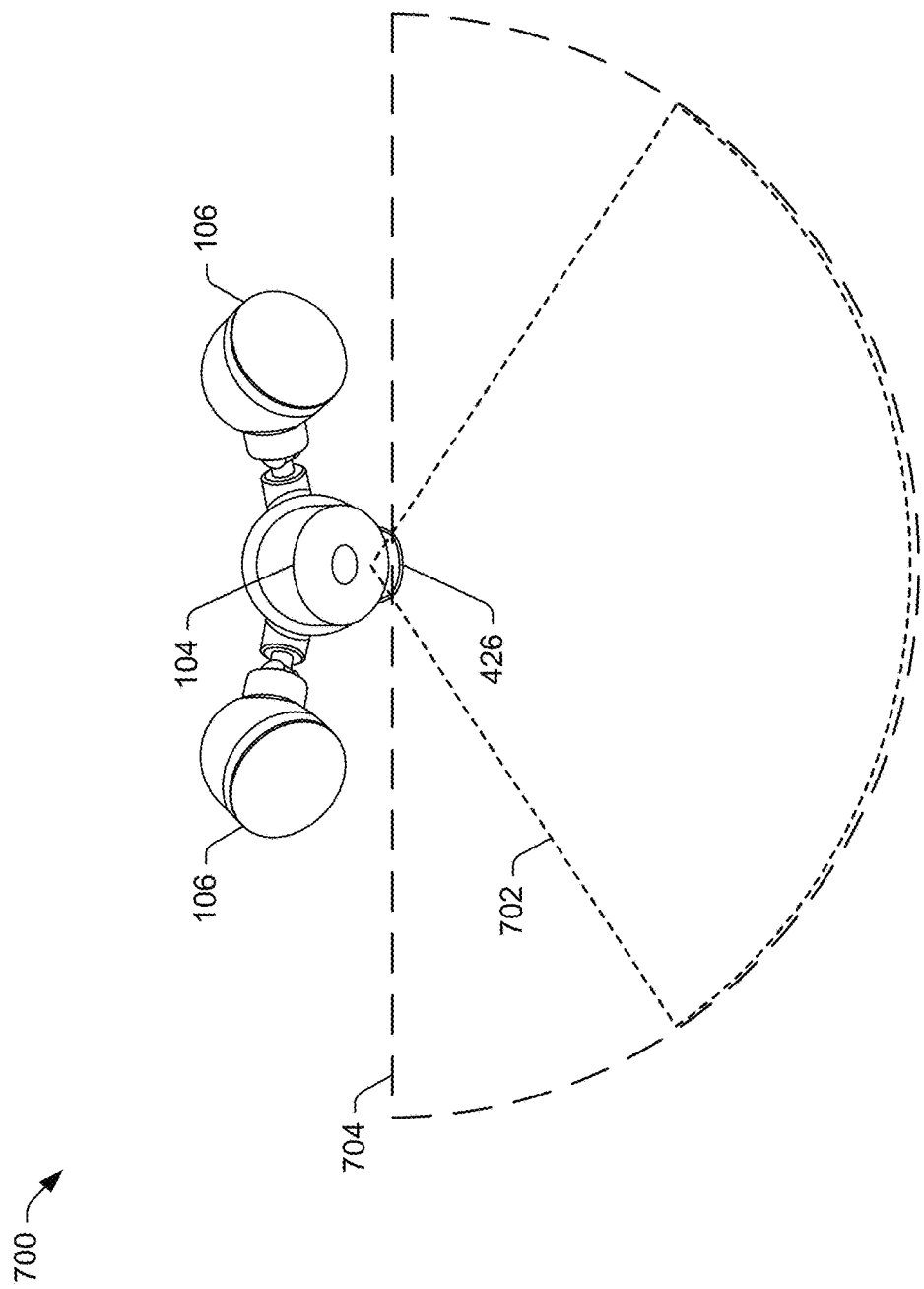
FIG. 7 illustrates an example implementation of the floodlight device from FIG. 1 in accordance with an FOV of the PIR sensors and an FOV of a PIR sensor within the camera device mounted to the floodlight device.

FIG. 7 illustrates an example implementation 700 of the floodlight device 102 from FIG. 1 in accordance with an FOV of the PIR sensors 422 and an FOV of a PIR sensor within the camera device 104 mounted to the floodlight device 102. The camera device 104 may have a built-in PIR sensor for detecting motion within a camera PIR FOV (e.g., first PIR FOV 702), which typically is approximately 120 degrees for a single PIR sensor. The PIR sensors 422 (from FIG. 6 and positioned behind the PIR lens 426) on the floodlight device 102 have a PIR FOV (e.g., second PIR FOV 704), which is broader than the first PIR FOV 702. For example, the second PIR FOV 704 may be have an angular range of approximately 180 degrees (horizontal). Further, the second PIR FOV 704 may have an approximate 30-degree vertical FOV. In an example, if the floodlight device 102 is mounted at a height within a range of 1.8 to 3 meters (m), the PIR sensors 422 may detect a person walking (e.g., 0.9 m/s) up to a distance of approximately 7.6 m away from the PIR sensors 422. Continuing the example, the PIR sensors 422 may have a range of approximately 7.6 m at zero degrees pan (relative to the central axis 204 of the main housing 110) and 4.5 m at a 180 degrees pan (relative to the central axis 204).

Because the PIR sensors 422 have a broader PIR FOV than that of the modular camera system (e.g., the camera device 104), the floodlight device 102 expands the PIR capability of the modular camera system. In this way, the PIR sensors 422 of the floodlight device 102 may detect motion outside the first PIR FOV 702 of the camera device 104 and, based on detection of motion by the PIR sensors 422, the MCU 420 may then activate (e.g., turn on) the LEDs in the light subassemblies 106 to provide light to the environment around the floodlight device 102. In addition, the floodlight device 102 can signal the camera device 104 to activate its image sensor and begin capturing images or recording video of a scene viewed through a camera lens of the camera device 104, which may help the camera device 104 to anticipate an object moving into the FOV of the image sensor by initiating video recording before the object enters the image sensor's FOV. This expanded PIR FOV (e.g., the second PIR FOV 704) provided by the PIR sensors 422 of the floodlight device 102 provides a consistent and broad FOV for motion detection for the light subassemblies 106 of the floodlight device 102 and for the pivotally movable and modular camera device 104. Accordingly, the camera device 104 can be reoriented (as described with respect to FIG. 2) without leaving blind spots in the PIR FOV because the second PIR FOV 704 maintains coverage of areas outside of the first PIR FOV 702.

Figure 8:
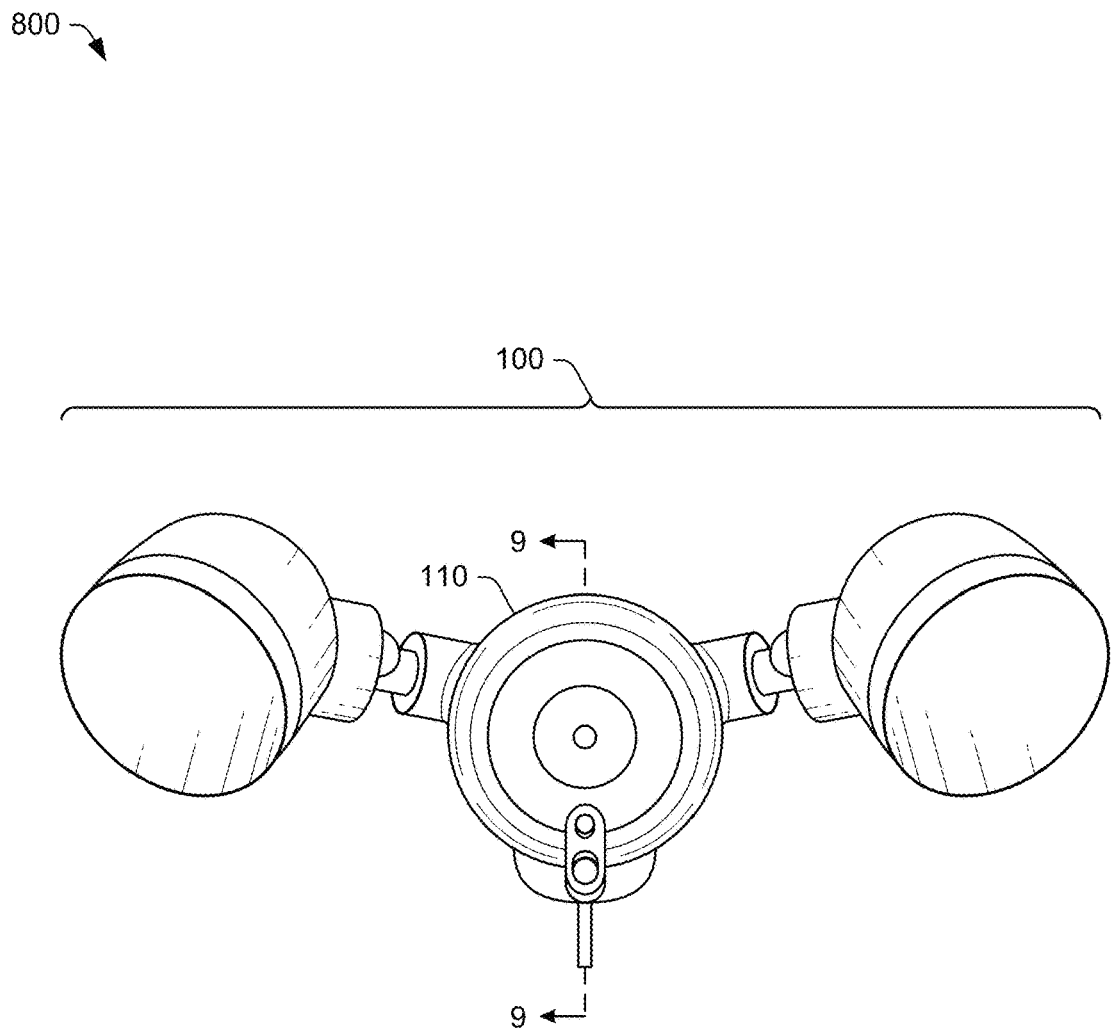
FIG. 8 illustrates a front elevational view of the floodlight device from FIG. 1.

FIG. 8 illustrates a front elevational view 800 of the floodlight device 102 from FIG. 1. As illustrated, the hinge connecting each light subassembly 106 to the main housing 110 enables the light subassembly 106 to pivotally move in up to three axes of rotation. Accordingly, the hinge enables the light subassembly 106 to be easily adjustable by the consumer.

Figure 9:
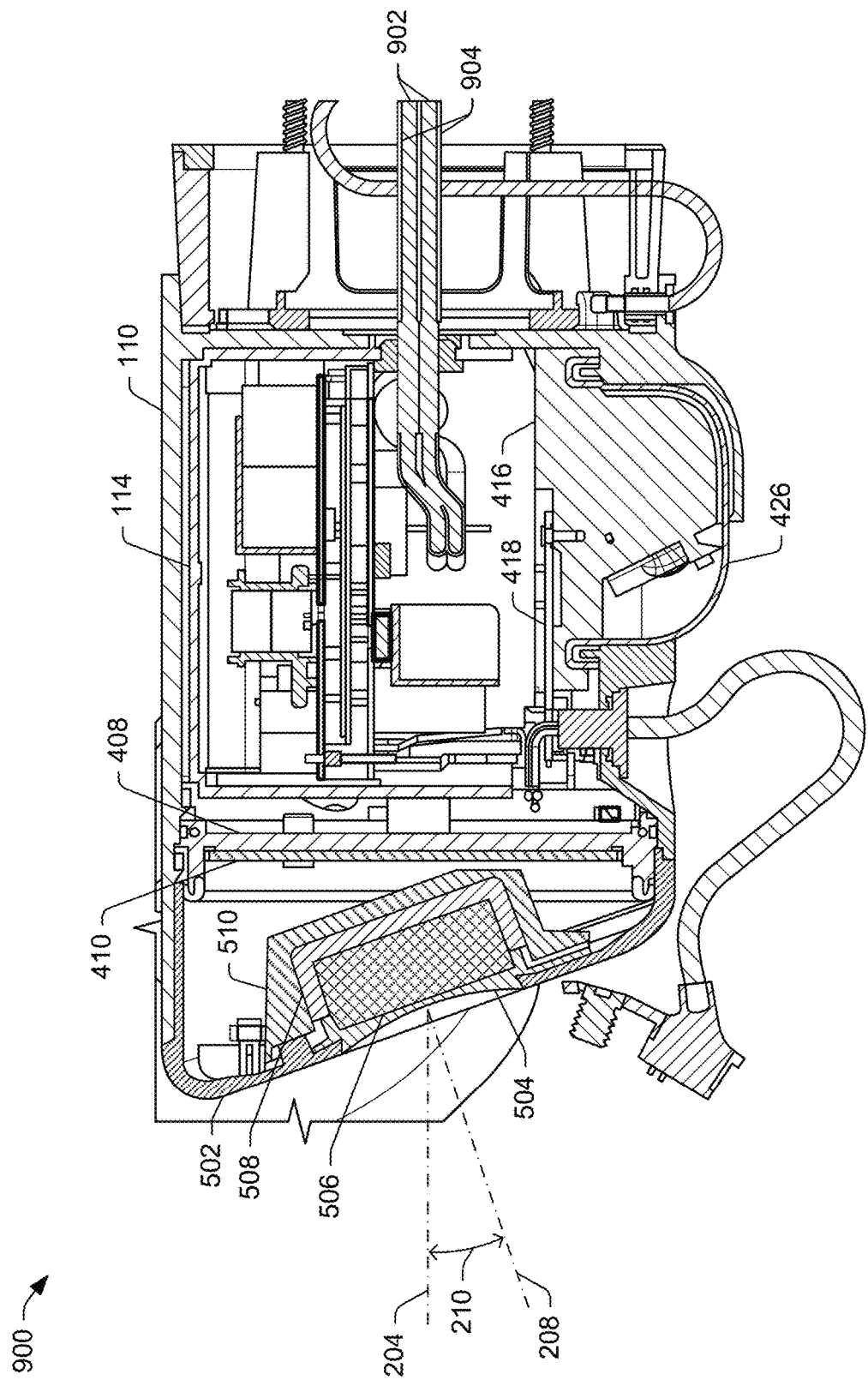
FIG. 9 illustrates a sectional view of the main housing of the floodlight device from FIG. 8, taken along line 9-9.

FIG. 9 illustrates a sectional view 900 of the main housing 110 of the floodlight device 102 from FIG. 8, taken along line 9-9. As illustrated, the main housing 110 of the floodlight device 102 includes a compact architecture that provides a reduction in size compared to that of some conventional floodlights, a modular structure having a magnetic mount that enables 3-axis articulation (e.g., rotation about three axes in a cartesian coordinate system) of a modular camera system, and an expanded PIR FOV for the modular camera system. The floodlight device 102 may also provide line power to the modular camera system.

As illustrated in FIG. 9 (and as described in FIG. 2), the front surface 206 of the magnet mount assembly 122 defines a plane that is tilted relative to the central axis 204 by a tilt angle that is substantially within a range of 10 to 30 degrees (e.g., 20 degrees) below the central axis 204. In addition, the magnet holder 510 is attached to an interior surface of the front cover 502 and supports the magnet shroud 508 within a recessed area of the magnet holder 510. The magnet 506 is supported by and positioned at least partially within the magnet shroud 508. The magnet 506 and the magnet shroud 508 are positioned between the magnet holder 510 and the interior surface of the front cover 502. Further, the mounting component 504 is positioned between the magnet 506 and the front cover 502 and provides the contact surface for mounting the camera device 104 (from FIG. 1). Behind the magnet holder 510 (e.g., between a backside of the magnet holder 510 and the PSU 114) is the inner frame 408 and the magnet shielding component 410. Accordingly, both the magnet shroud 508 and the magnet shielding component 410 are located between the magnet 506 and the PSU 114 to protect the PSU 114 from the magnetic field generated by the magnet 506.

The PIR holder 416 is positioned within the main housing 110 and below the PSU 114. The PIR board 418 is located between the PSU 114 and the PIR holder 416. As described, the PIR holder 416 is positioned within an aperture in the main housing 110 and supports the PIR sensors 422 in an orientation that enables the PIR sensors 422 to transmit and receive PIR signals to and from an environment surrounding the main housing 110. The PIR lens 426 augments the FOV of the PIR sensors 422 and also protects the PIR sensors 422 from debris, dust, and moisture. The PIR lens 426 may be any suitable lens that is IR translucent, including a Fresnel lens.

Because of the twist lock formed between the main housing 110 and the wallplate 108, a cable (e.g., electrical wires 902) of the PSU 114 may get pinched during installation due to twisting of the cable. To prevent the electrical wires 902 from being pinched, a shrink tube 904 is implemented around a portion of the electrical wires 902 proximate to the second end of the main housing 110. The shrink tube 904 may be any suitable material (e.g., heat shrink material) that provides rigidity to protect the electrical wires 902 from being pinched when the main housing 110 is assembled (via the twist lock mechanism) to the wallplate 108. In aspects, the shrink tube 904 may cover any suitable length of the electrical wires 902, including a length substantially within a range of 10 mm to 50 mm.

Figure 10:
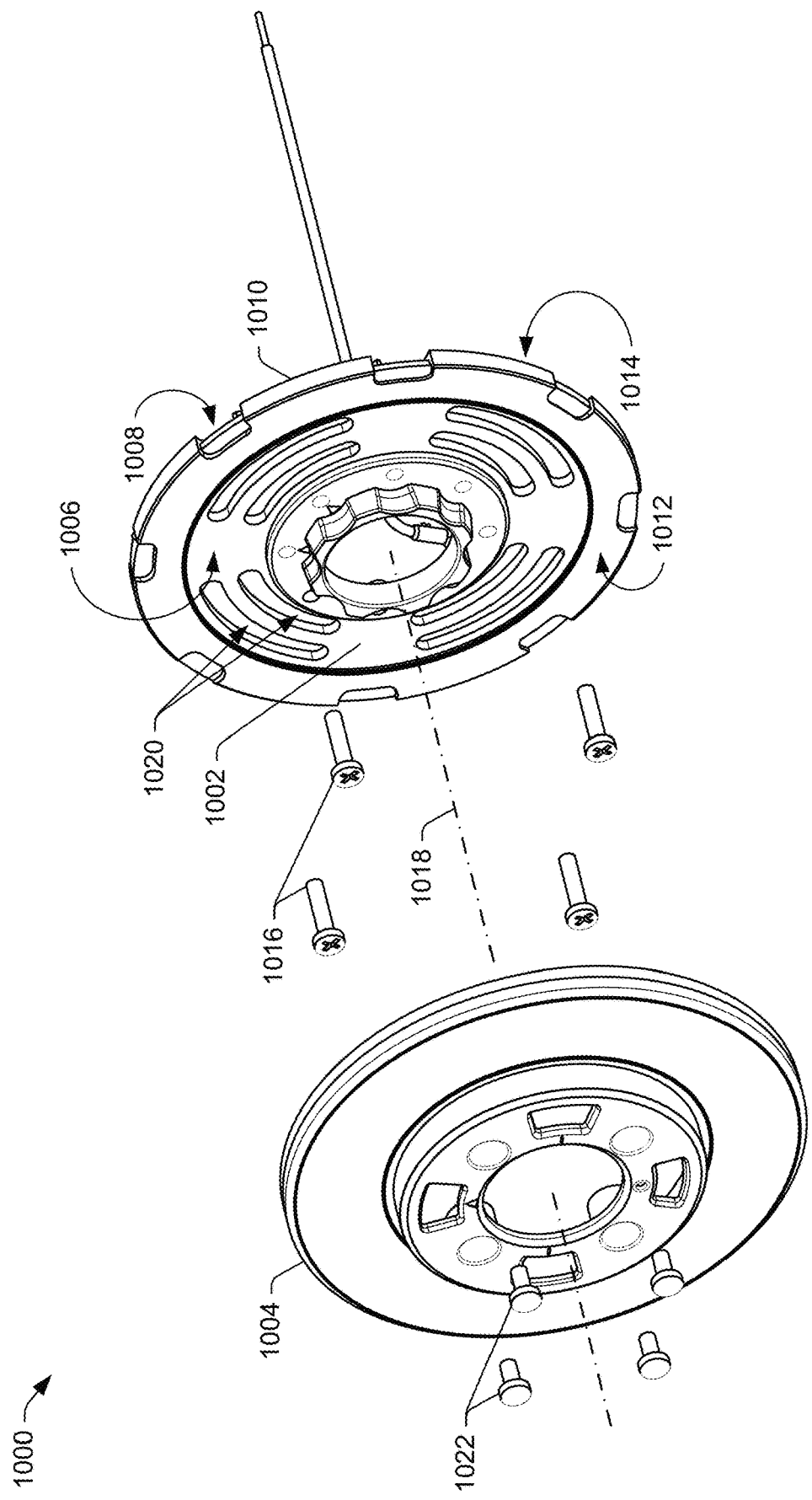
FIG. 10 illustrates an exploded view of the wallplate from FIG. 1.

FIG. 10 illustrates an exploded view 1000 of the wallplate 108 from FIG. 1. The wallplate 108 includes a trim plate 1002 and a cover plate 1004. The trim plate 1002 has a disk-like shape with front and back sides (e.g., front side 1006 and back side 1008) and is configured to be affixed to a surface (e.g., a wall or a junction box in the wall). The trim plate 1002 includes a mounting gasket 1010 that is assembled to the trim plate 1002 and substantially covers the periphery of the trim plate 1002, including at least a portion of each of the front and back sides 1006 and 1008, respectively. The mounting gasket 1010 has a general ring shape with a C-shaped cross-section for covering the edges of the trim plate 1002. Further, the mounting gasket 1010 includes a front exterior side 1012 that abuts the cover plate 1004 and forms a watertight seal with the cover plate 1004 when the wallplate 108 is assembled. The mounting gasket 1010 also includes a rear exterior side 1014 that, when the wallplate 108 is mounted to a surface (e.g., a wall), is configured to abut and form a seal with that surface. The trim plate 1002 may be affixed to the junction box via any suitable fastener, including fasteners 1016. Further, the trim plate 1002 is configured to be rotatably adjusted about a center axis (e.g., center axis 1018) by ±45 degrees to conform to different configurations of junction boxes by positioning the fasteners 1016 in curved slots 1020. In aspects, the cover plate 1004 is fastened to the trim plate 1002 via fasteners (e.g., fasteners 1022).

Figure 11:
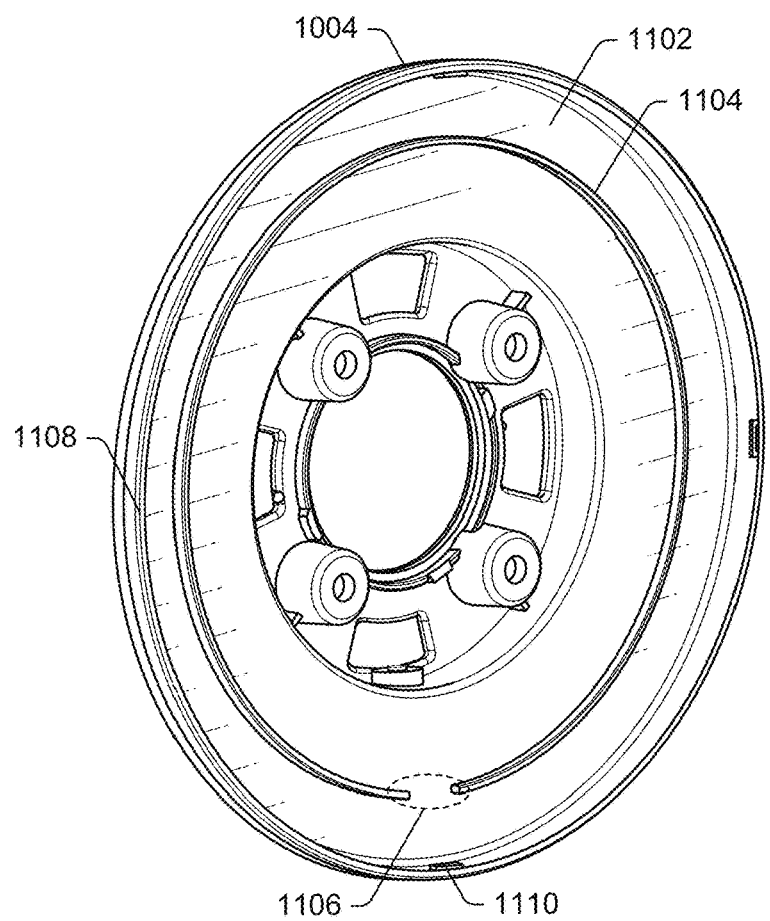
FIG. 11 illustrates a backside view of the cover plate from FIG. 10.

FIG. 11 illustrates a backside view 1100 of the cover plate 1004 from FIG. 10. The cover plate 1004 includes backside surface 1102 and a rim 1104 projecting from the backside surface 1102. The rim 1104 is configured to interface with the mounting gasket 1010 in FIG. 10 to create a watertight seal. The rim 1104 includes a notch (e.g., notch 1106) to enable water drainage. The cover plate 1004 includes a perimeter wall 1108 surrounding the backside surface 1102 to create a recessed area to receive and support the mounting gasket 1010. The perimeter wall 1108 defines an aperture (e.g., drainage hole 1110) that provides a path for water to drain out of the cover plate 1004. When mounted to a wall, the cover plate 1004 may be oriented to have the notch 1106 located at a lowest point of the rim 1104 and the drainage hole 1110 located at a lowest point of the perimeter wall 1108, to enable water to drain out due to gravity.

Figure 12:
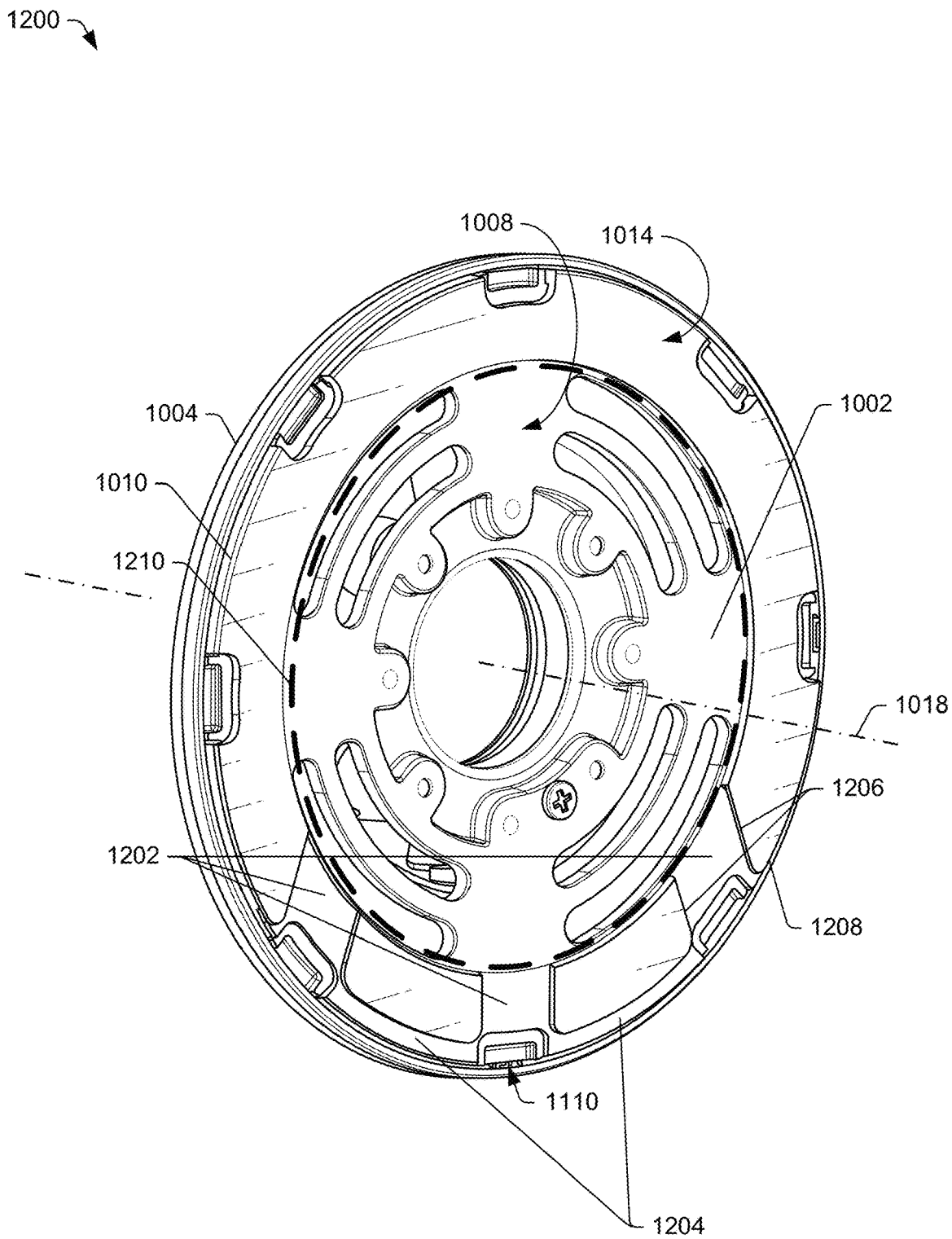
FIG. 12 illustrates a rear isometric view of the wallplate from FIG. 1.

Continuing, FIG. 12 illustrates a rear isometric view 1200 of the wallplate 108 from FIG. 1. As illustrated, the cover plate 1004 is shaped to define a recessed area that supports the trim plate 1002. The mounting gasket 1010 provides a watertight seal between the front side 1006 (in FIG. 10) of the trim plate 1002 and the backside surface 1102 (in FIG. 11) of the cover plate 1004. The mounting gasket 1010 is also configured to provide a watertight seal between the trim plate 1002 and the wall (or the junction box). Accordingly, the mounting gasket 1010 provides a watertight seal on both the front and back sides 1006 and 1008 of the trim plate 1002. In addition, the mounting gasket 1010 includes multiple drainage slots 1202 (e.g., recessed areas) for water drainage in the event of water ingress into the interior of the wallplate 108. The drainage slots 1202 are defined on the rear exterior side 1014 of the mounting gasket 1010. In addition, the mounting gasket 1010 includes channels 1204 that connect at least some of the drainage slots 1202 along a perimeter (e.g., proximate an edge) of the mounting gasket 1010. Accordingly, if the wallplate 108 is rotated about a center axis (e.g., the center axis 1018), water may exit the wallplate 108 via the drainage slots 1202 and the channels 1204 due to gravity. The drainage slots 1202 and the channels 1204 may have any suitable depth, including a depth substantially within a range of 0.5 millimeter (mm) to 1.5 mm (e.g., a 1.0 mm depth).

Although the illustrated example includes three drainage slots 1202, any suitable number of slots may be implemented, including one, two, three, four, and so forth. For purposes of discussion, three drainage slots 1202 are described, e.g., a middle slot and two outer slots. In aspects, at least one of the drainage slots 1202 (e.g., outer slot) includes sidewalls 1206 that are non-orthogonal to an edge (e.g., edge 1208) of the mounting gasket 1010. Rather, the sidewalls 1206 are oriented to reduce the likelihood of water ingress through the drainage slot 1202 when the wallplate 108 is rotated about the center axis 1018 up to about 45 degrees (depending on the configuration of the junction box to which the wallplate 108 is mounted). However, in the event that water does ingress into one of the drainage slots 1202, the water can drain out of a neighboring drainage slot 1202 via one or more of the channels 1204 or via a center area (e.g., center area 1210) of the mounting gasket 1010. In aspects, water may drain through the drainage slots 1202 and/or the channels 1204 and through the drainage hole 1110 in the cover plate 1004 to exit the interior of the cover plate 1004.

Figure 13:
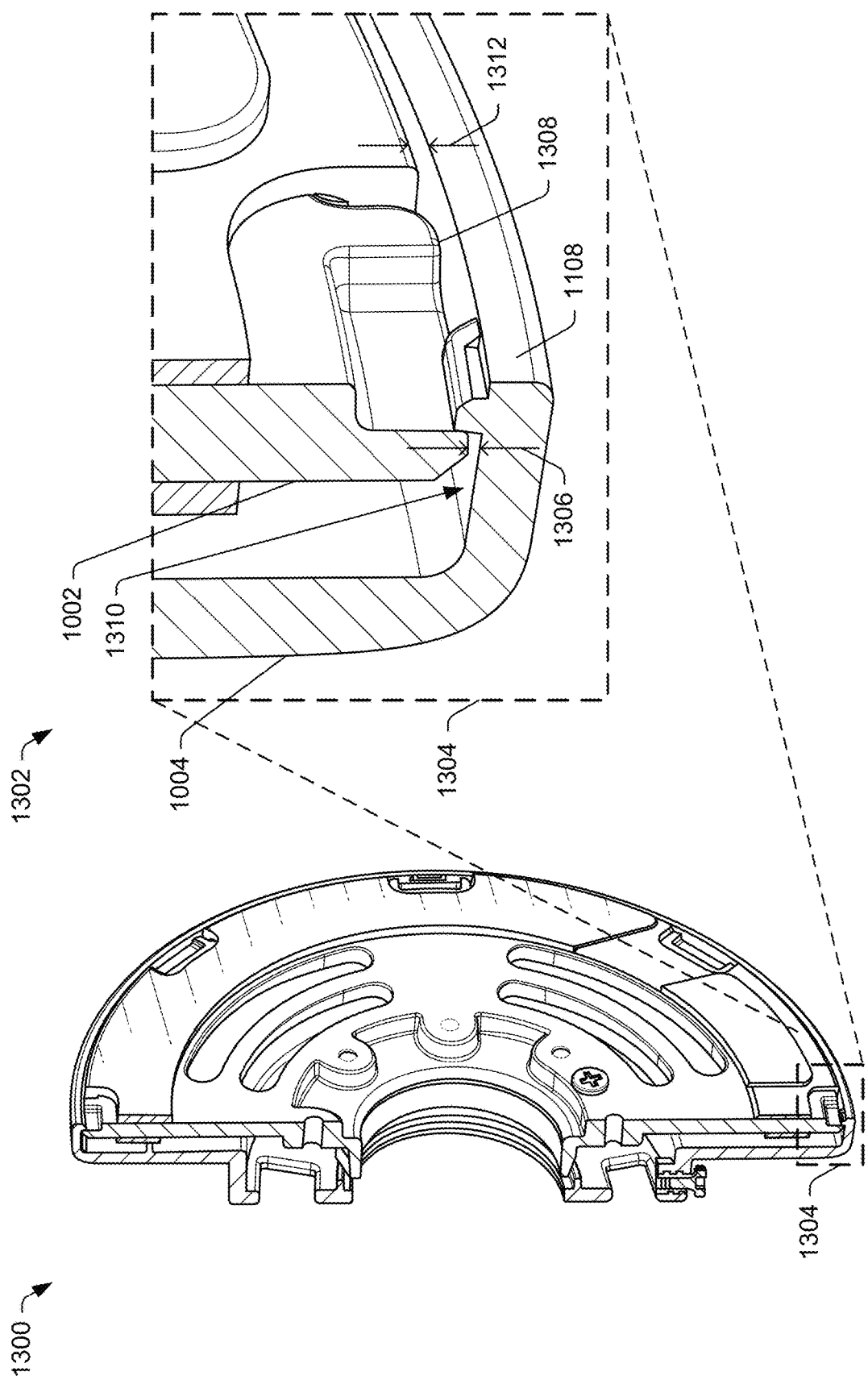
FIG. 13 illustrates a sectional view of the wallplate from FIG. 1 and an enlarged view of a portion thereof.

FIG. 13 illustrates a sectional view 1300 of the wallplate 108 from FIG. 11 and an enlarged view 1302 of a portion 1304 thereof. In the enlarged view 1302, a gap 1306 (e.g., clearance) is defined between a perimeter 1308 of the trim plate 1002 and an inner surface 1310 of the perimeter wall 1108 of the cover plate 1004. The gap 1306 is implemented to enable water drainage. A similar clearance gap (e.g., gap 1312) for water drainage may be defined between the mounting gasket 1010 and the inner surface 1310 of the perimeter wall 1108 of the cover plate 1004. Any suitable size may be implemented for the gaps 1306 and 1312, including a size substantially within a range of 0.25 mm to 0.5 mm (e.g., 0.33 mm).

Water may ingress into the center area 1210 of the wallplate due to an uneven mounting surface (e.g., on the wall around the junction box) or due to improper installation by a user. Accordingly, the drainage slots 1202 and the channels 1204 provide a path for water to exit in the event of water ingress.

Although techniques using and apparatuses for a modular floodlight system are described, it is to be understood that the subject of the appended claims is not necessarily limited to the specific features or methods described. Rather, the specific features and methods are disclosed as example ways in which a modular floodlight system can be implemented.

Some examples are provided below:

A modular floodlight system comprising: a floodlight device comprising: a main housing having a generally cylindrical shell with a central axis intersecting opposing first and second ends of the main housing; first and second light subassemblies connected to the main housing at lateral sides of the shell that are substantially parallel to the central axis, the main housing positioned between the first and second light subassemblies, each of the first and second light subassemblies including a light housing having a general cylindrical shell with a rounded cap; a passive infrared, PIR, lens positioned on a side of the main housing and between the first and second light subassemblies, the PIR lens having a dome shape that protrudes from the side of the main housing and houses multiple PIR sensors configured to detect motion of an object within a field of view of the multiple PIR sensors; a magnet mount assembly attached to the first end of the main housing, the magnet mount assembly including: a front surface defining a plane that is non-orthogonal to the central axis of the main housing; and a magnet providing a magnetic force configured to act on a metal part of the modular camera system to magnetically secure the modular camera system to the magnet mount.

The floodlight device may further comprise a mounting component having a flexible material that forms a contact surface for mounting a modular camera system; the mounting component may be positioned between the magnet and the front surface; and the contact surface may be a concave surface that is complementary to an exterior convex surface of the modular camera system.

The plane defined by the front surface may be tilted relative to the central axis by a tilt angle that is substantially within a range of one degree to 30 degrees.

The modular floodlight system may further comprise the modular camera system, wherein: the modular camera system includes a housing having a general cup shape with a rounded closed end; the rounded closed end has a convex exterior surface; and the camera device, when assembled to the magnet mount assembly, includes 3-axis articulation relative to the main housing.

The modular camera system may include the metal part inside of the housing.

The 3-axis articulation of the modular camera system may be pivoted at a center of curvature of the convex exterior surface of the camera device.

The 3-axis articulation of the modular camera system may include slidable movement of the exterior convex surface of the housing of the modular camera system on the magnet mount assembly.

The modular floodlight system may further comprise: a power supply unit positioned within the main housing, the power supply unit configured to provide electrical power to the first and second light subassemblies and the multiple PIR sensors.

The modular floodlight system may further comprise: a cable configured to connect the power supply unit to the modular camera system to enable the power supply unit to provide electrical power to the modular camera system.

The cable may have a length sufficient to enable the modular camera system to have a range of tilt substantially between zero degrees and 60 degrees relative to the central axis of the main housing; the modular camera system may be aligned with the central axis when the tilt angle is zero degrees; and the modular camera system may face a direction between the central axis and the PIR sensors when the tilt angle is 60 degrees.

The magnet mount assembly may enable the modular camera system to have 3-axis articulation.

The 3-axis articulation may include a range of pan of substantially 35 degrees to −35 degrees relative to the central axis of the main housing.

The modular floodlight system may further comprise a wallplate configured to mount to a surface, wherein the first end of the main housing is assembled to the wallplate via a twist lock mechanism formed via protrusions mating with apertures or channels based on a twist motion of the main housing about the central axis and relative to the wallplate.

A respective light subassembly of the first and second light subassemblies may be connected to the main housing via a hinge that enables the respective light subassembly to pivotally rotate about three axes.

The modular floodlight system may further comprise a microcontroller unit, wherein the microcontroller unit is configured to, responsive to motion detected by the one or more PIR sensors: activate the first and second light subassemblies to provide light; and signal the modular camera system to activate an image sensor of the modular camera system and begin capturing images or recording video.

What is claimed is:

1. A modular floodlight system comprising:
    a floodlight device comprising:
        a main housing having a generally cylindrical shell with a central axis intersecting opposing first and second ends of the main housing;
        first and second light subassemblies connected to the main housing at lateral sides of the shell that are substantially parallel to the central axis, the main housing positioned between the first and second light subassemblies, each of the first and second light subassemblies including a light housing having a general cylindrical shell with a rounded cap;
        a passive infrared, PIR, lens positioned on a side of the main housing and between the first and second light subassemblies, the PIR lens having a dome shape that protrudes from the side of the main housing and houses multiple PIR sensors configured to detect motion of an object within a field of view of the multiple PIR sensors;
        a magnet mount assembly attached to the first end of the main housing, the magnet mount assembly including:
            a front surface defining a plane that is non-orthogonal to the central axis of the main housing; and
            a magnet providing a magnetic force configured to act on a metal part of a modular camera device to magnetically secure the camera device to the magnet mount.

2. The modular floodlight system of claim 1, wherein:
    the floodlight device further comprises a mounting component having a flexible material that forms a contact surface for mounting a camera device;
    the mounting component is positioned between the magnet and the front surface; and
    the contact surface is a concave surface that is complementary to an exterior convex surface of the camera device.

3. The modular floodlight system of claim 1, wherein the plane defined by the front surface is tilted relative to the central axis by a tilt angle that is a non-zero angle up to approximately 45 degrees.

4. The modular floodlight system of claim 1, further comprising the camera device, wherein:
the camera device includes a housing having a general cup shape with a rounded closed end;
the rounded closed end has a convex exterior surface; and
the camera device, when assembled to the magnet mount assembly, includes 3-axis articulation relative to the main housing.

5. The modular floodlight system of claim 4, wherein the camera device includes the metal part inside of the housing.

6. The modular floodlight system of claim 4, wherein the 3-axis articulation of the camera device is pivoted at a center of curvature of the convex exterior surface of the camera device.

7. The modular floodlight system of claim 4, wherein the 3-axis articulation of the camera device includes slidable movement of the exterior convex surface of the housing of the camera device on the magnet mount assembly.

8. The modular floodlight system of claim 1, further comprising a power supply unit positioned within the main housing, wherein the power supply unit is configured to provide electrical power to the first and second light subassemblies and the multiple PIR sensors.

9. The modular floodlight system of claim 8, further comprising a cable configured to connect the power supply unit to the camera device to enable the power supply unit to provide electrical power to the camera device.

10. The modular floodlight system of claim 9, wherein:
the cable has a length sufficient to enable the camera device to have a range of tilt substantially between zero degrees and 60 degrees relative to the central axis of the main housing;
the camera device is aligned with the central axis when the tilt angle is zero degrees; and
the camera device is facing a direction between the central axis and the multiple PIR sensors when the tilt angle is 60 degrees.

11. The modular floodlight system of claim 1, wherein the magnet mount assembly enables the camera device to have 3-axis articulation.

12. The modular floodlight system of claim 11, wherein the 3-axis articulation includes a range of pan of substantially 35 degrees to −35 degrees relative to the central axis of the main housing.

13. The modular floodlight system of claim 1, further comprising a wallplate configured to mount to a surface, wherein the first end of the main housing is assembled to the wallplate via a twist lock mechanism formed via protrusions mating with apertures or channels based on a twist motion of the main housing about the central axis and relative to the wallplate.

14. The module floodlight system of claim 13, wherein:
the wallplate includes a cover plate, a trim plate, and a mounting gasket;
the mounting gasket includes a front exterior side that is configured to abut the cover plate and form a watertight seal with the cover plate; and
the mounting gasket includes a rear exterior side that is configured to, when the wallplate is mounted to the surface, abut and form a seal with the surface.

15. The module floodlight system of claim 14, wherein the mounting gasket:
defines multiple drainage slots on the rear exterior side; and
includes one or more channels that connect at least some of the drainage slots along a perimeter of the mounting gasket.

16. The module floodlight system of claim 15, wherein:
the mounting gasket includes sidewalls defining at least one drainage slot of the multiple drainage slots; and
the sidewalls defining the at least one drainage slot are non-orthogonal to an edge of the mounting gasket.

17. The modular floodlight system of claim 1, wherein a respective light subassembly of the first and second light subassemblies is connected to the main housing via a hinge that enables the respective light subassembly to pivotally rotate about three axes.

18. The modular floodlight system of claim 1, further comprising a microcontroller unit, wherein the microcontroller unit is configured to, responsive to motion detected by the multiple PIR sensors:
activate the first and second light subassemblies to provide light; and
signal the camera device to activate an image sensor of the camera device and begin capturing images or recording video.

19. The module floodlight system of claim 1, wherein the multiple PIR sensors have a first field of view that expands and supplements a PIR capability of the camera device that is magnetically secured to the magnet mount.

20. The module floodlight system of claim 19, wherein the first field of view of the multiple PIR sensors is different than a second field of view of a camera PIR sensor of the camera device.

* * * * *